United States Patent
Kloppenburg et al.

(10) Patent No.: US 9,758,646 B2
(45) Date of Patent: Sep. 12, 2017

(54) NDBR WET MASTERBATCH

(71) Applicant: LANXESS Deutschland GmbH, Cologne (DE)

(72) Inventors: Heike Kloppenburg, Dusseldorf (DE); Alex Lucassen, Dormagen (DE); David Hardy, Dormagen (DE); Thomas Gross, Wuelfrath (DE); Judy Elizabeth Douglas, Beaumont, TX (US)

(73) Assignee: ARLANXEO Deutschland GmbH, Dormagen (DE)

( * ) Notice: Subject to any disclaimer, the term of this patent is extended or adjusted under 35 U.S.C. 154(b) by 388 days.

(21) Appl. No.: 14/355,241

(22) PCT Filed: Oct. 26, 2012

(86) PCT No.: PCT/EP2012/071288
§ 371 (c)(1),
(2) Date: Apr. 30, 2014

(87) PCT Pub. No.: WO2013/064434
PCT Pub. Date: May 10, 2013

(65) Prior Publication Data
US 2014/0309332 A1    Oct. 16, 2014

(30) Foreign Application Priority Data
Nov. 3, 2011  (WO) ............... PCT/US2011/059134

(51) Int. Cl.
*C08J 3/20* (2006.01)
*C08L 9/00* (2006.01)
*B60C 1/00* (2006.01)

(52) U.S. Cl.
CPC . *C08L 9/00* (2013.01); *B60C 1/00* (2013.01)

(58) Field of Classification Search
CPC ............... C08J 3/22; C08K 3/04; C08K 11/00
See application file for complete search history.

(56) References Cited

U.S. PATENT DOCUMENTS

| | | | |
|---|---|---|---|
| 3,048,559 A | 8/1962 | Heller et al. | |
| 4,029,633 A | 6/1977 | Hagopian et al. | |
| 4,255,296 A * | 3/1981 | Ogawa | C08L 7/00 524/255 |
| 4,260,707 A | 4/1981 | Sylvester et al. | |
| 6,437,205 B1 | 8/2002 | Miller et al. | |
| 8,846,837 B2 * | 9/2014 | Kloppenburg | B60C 1/00 526/153 |
| 9,279,025 B2 * | 3/2016 | Kloppenburg | B60C 1/00 |
| 9,284,385 B2 * | 3/2016 | Kloppenburg | A63B 37/0003 |
| 2005/0222317 A1 | 10/2005 | Yatsuyanagi et al. | |
| 2011/0230624 A1 | 9/2011 | Kloppenburg et al. | |
| 2011/0269889 A1 * | 11/2011 | Short | C08K 3/0033 524/444 |
| 2015/0252126 A1 * | 9/2015 | Kloppenburg | C08C 19/00 525/313 |
| 2016/0257770 A1 * | 9/2016 | Kloppenburg | C08C 19/08 |

FOREIGN PATENT DOCUMENTS

EP    0011184 A1    5/1980

OTHER PUBLICATIONS

Maiwald, S., "Highly Active Single-Site Catalysts for the 1,4-cis Polymerization of Butadiene from Allylneodymium (III) Chlorides and Trialkylaluminiums—A Contribution to the Activation of Tris(allyl)neodymium (III) and the Further Elucidation of the Structure-Activity Relationship", Macromol. Chem. Phys. 2002, 203, p. 1029-1039.

Grimmer, G., et al. "Profile of the polycyclic aromatic compounds from crude oils", Fresenius, Analytical Chemistry, 1983, vol. 314, Issue 1, Abstract.

International Search Report from International Application No. PCT/EP2012/071288, dated Dec. 12, 2012, three pages.

* cited by examiner

*Primary Examiner* — Hannah Pak

(57) ABSTRACT

The invention relates to an NdBR wet masterbatch comprising —neodymium-catalyzed polybutadienes having a high proportion of cis-1,4 units of >95% and a low proportion of 1,2-vinyl content of <1%, with narrow polydispersity of less than 3, with a Mooney viscosity ($ML_{1+4}$ 100° C.) between 30 and 90 MU, with a high linearity index (ratio of solution viscosity to Mooney viscosity) of 3 to 10 m Pas/MU and with a Mooney relaxation after 30 seconds of 2 to 12%, the latter being prepared by means of solution polymerization, —at least one carbon black, the carbon black having an iodine absorption number (ION) between 85 and 210 mg/g, measured to ASTM D1510-1304, and an oil absorption number (OAN) between 75 and 150 ml/100 g, measured to ASTM D2414, and —an oil.

6 Claims, No Drawings

NDBR WET MASTERBATCH

The present invention relates to an NdBR wet masterbatch for the production of vulcanized rubbers with improved rolling resistance, and to the production and use thereof.

Numerous products of economic significance are formed from elastomeric compositions, by dispersing fillers in a wide variety of different synthetic elastomers, natural rubber or elastomer mixtures. For example, carbon black is used extensively as a reinforcing agent in natural rubber and other elastomers. In order to enable the use of such mixtures for use in particular application sectors, so-called masterbatches are typically produced, i.e. a premixture of filler, elastomer and various optional additives, for instance an extending oil.

It is generally understood that the properties of a carbon black influence the properties of rubber or polymer compounds comprising carbon black. In the production of tyres, it is generally desirable to use carbon black-comprising tyre tread compounds which have satisfactory filler distribution and filler binding. The better the filler binding of a rubber compound, the smaller the Payne effect and the smaller the energy dissipation resulting from free mobility between the polymer matrix and the fillers in the tread of a tyre which is produced with the rubber compound, and the smaller the rolling resistance and hence the higher the saving of fuel which can be achieved while driving.

In the production of tyres, it is also generally desirable to use tyre tread compounds into which carbon blacks having satisfactory hysteresis are incorporated. The hysteresis of a rubber compound relates to the energy which is released under deformation. Tyres which are produced with tread compounds having lower hysteresis values will have a reduced rolling resistance, which results in reduced petroleum consumption of the vehicle on which the tyre is used.

The prior art discloses various carbon blacks of varying structure. By using these different kinds of carbon blacks, carbon black masterbatches are produced with various qualities suitable for the different fields of use. Not only does the selection of the carbon blacks play a major role in the production of carbon black masterbatch, but another important factor is the selection of the elastomeric compositions. For example, for the sector of motor vehicle tyres alone, there are different possible elastomeric compositions which are usable for the tread or the profile, the side walls, the steel mesh and the carcass.

Other fields of use include, for example, engine mounting bushes, conveyor belts and the like.

Even though a wide range of performance features can be achieved using the currently available materials and production techniques, there is a constant need in industry to develop elastomeric compositions which have improved properties and which reduce the costs and complexity of the current production techniques.

The production of such masterbatches involves production by vigorous mixing of the carbon black or another filler with natural rubber or another elastomer, which entails prolonged and relatively vigorous mixing, with the following disadvantages: that increased energy costs, production times and similar concerns arise.

It is additionally known that, for carbon blacks with particular surface and structural properties, it is impossible or commercially unviable with the conventional mixing apparatus and techniques to produce economically utilizable masterbatches.

In order to achieve a good quality and consistency of the masterbatch, an important factor is good dispersion of carbon black in rubber compounds.

It is well known that carbon blacks with higher or lower structure and surface area can be used to obtain the performance features of an elastomeric composition. For example, it is known that carbon blacks with higher surface area and lower structure improve resistance to fracture growth and stability to cutting and chipping, and also abrasion resistance and other qualities.

Typically, masterbatches are produced in a dry mixing technique, by processing the elastomeric composition with the carbon black or another additive by repeated mixing in a kneader and/or a roller with long intermediate storage times.

In addition to these dry mixing techniques, it is known that latex and a carbon black slurry can be supplied continuously in a coagulation tank while stirring. Such "bulk" techniques are generally used in the case of synthetic elastomers. The coagulation tank contains a coagulant, for instance salt or an aqueous acidic solution (typical of a pH of 2.5 to 4). The latex and the carbon black slurry are mixed and coagulated in the coagulation tank to give small wet crumbs. The crumbs and the acid effluent are separated from one another and the crumbs are then poured into a second tank with a stirrer apparatus, where they are washed. Thereafter, a drying step is introduced.

Such a process is described in U.S. Pat. No. 4,029,633. U.S. Pat. No. 3,048,559 also describes such a production process, wherein an acid or salt coagulant solution is added.

It has now been found that a specific carbon black type is of particularly good suitability for the production of NdBR masterbatch, which both the processability and the vulcanized rubbers obtained therefrom has improved properties.

It is therefore an object of the invention to provide an NdBR wet masterbatch with which vulcanized rubbers with improved properties can be produced and, in the course of production thereof, the process steps can be reduced, and hence also the production costs.

To achieve this object, an NdBR wet masterbatch is presented, which comprises a neodymium-catalysed polybutadiene having a high proportion of cis-1,4 units of >95% and a low proportion of 1,2-vinyl content of <1%, with narrow polydispersity of <3, with a Mooney viscosity ($ML_{1+4}$ 100° C.) between 30 and 90 MU, with a high linearity index (ratio of solution viscosity to Mooney viscosity) of 3 to 10 mPas/MU and with a Mooney relaxation after 30 seconds of 2 to 12%, the latter being prepared by means of solution polymerization, at least one carbon black, the carbon black having an iodine absorption number (ION) between 80 and 210 mg/g, measured to ASTM D1510-1304, and an oil absorption number (OAN) between 75 and 150 ml/100 g, measured to ASTM D2414, and an oil.

It has been found that, surprisingly, it is possible with this carbon black type and this NdBR to produce an NdBR wet masterbatch which is suitable for the production of vulcanized rubbers for motor vehicle tyres with improved rolling resistance, and at the same time is producible in an economically advantageous and simple manner.

Carbon blacks are generally characterized on the basis of analytical properties. The specific surface area of the carbon black is reported as the iodine absorption number (ION), the unbound iodine being determined by an iodometric route by back-titration with sodium thiosulphate solution.

The oil absorption number (OAN) is determined by an empty volume measurement, analogously to test method ASTM D2414-09. For this purpose, oil is titrated into a sample of dry carbon black particles in a kneader at a constant rate. The oil mixes with the carbon black. After the empty volume of the carbon black particles has been filled up, the carbon black particles are moistened on the surface and the particles adhere to one another before they are distributed in the liquid oil phase. The maximum torque describes the OAN.

Polybutadienes are used as important constituents of rubber mixtures in the tyre industry, it being desirable to improve the final properties, for example to reduce rolling resistance and abrasion. Polybutadienes with a high proportion of cis-1,4 units have been produced on a large industrial scale for some time and are used for the production of tyres and other rubber products, and for impact modification of polystyrene.

To achieve high proportions of cis-1,4 units, particularly efficient catalysts based on rare earth compounds are currently being used, and these are described, for example, in EP-A1 0 011 184 and EP-B-A1 0 007 027.

It is known from the prior art that specifically neodymium-catalysed polybutadienes in the group of the high-cis-polybutadienes have particularly advantageous properties with regard to rolling resistance, abrasion and rebound resilience.

It is known to the person skilled in the art that polybutadienes with narrow polydispersity are produced using structurally defined single-site catalysts based on allyl complexes of the rare earths, as described, for example, in Macromolecular Chemistry and Physics, 2002 (203/7) 1029-1039.

In the production of polybutadienes, the catalyst systems used play an important role.

The neodymium catalyst used in industry, for example, is a Ziegler/Natta system which is formed from several catalyst components. In the Ziegler/Natta catalyst system, the known 3 catalyst components, usually consisting of a neodymium source, a chloride source and an organoaluminium compound are mixed in a wide variety of different ways under particular temperature conditions, the catalyst system being prepared for the polymerization with or without ageing.

The polybutadienes are preferably those which have been catalysed by neodymium-containing systems. Such systems are Ziegler-Natta catalysts based on neodymium compounds which are soluble in hydrocarbons.

The neodymium compounds used are more preferably neodymium carboxylates, neodymium alkoxides or neodymium phosphonates, especially neodymium neodecanoate, neodymium octanoate, neodymium naphthenate, neodymium 2,2-diethylhexanoate and/or neodymium 2,2-diethylheptanoate.

It is known that a minimum polydispersity (PDI) gives rise to excellent properties in tyre blends, for example low rolling resistance, high rebound resilience or low tyre abrasion. Polydispersity is generally determined from gel permeation chromatography (GPC); it corresponds to the ratio of weight-average molar mass Mw to number-average molar mass Mn, and thus represents the width of distribution of the molar masses.

A broad distribution of the molar masses shows good processing characteristics of the rubber and of the rubber mixtures, which is manifested, inter alia, in a lower mixing viscosity, lower mixing time and lower extrusion temperatures. However, the profile of tyre properties is adversely affected.

Conversely, a low polydispersity has a corresponding influence on the processing characteristics of the aforementioned polybutadiene.

Preference is given to an oil having a glass transition temperature ($T_g$) between −80° C. and −40° C. and a level of extractables extracted with DMSO by the IP 346 method of less than 3% by weight.

Preference is given to a hydrogenated naphthenic oil wherein the sum total of polycyclic aromatics is <10 ppm and the amount of alpha-benzopyrene<1 ppm, measured by the Grimmer test. The Grimmer test according to the method of Prof. Grimmer, Hamburg-Ahrensburg, is published in Fresenius, Analytische Chemie [Analytical Chemistry], 1983, volume 314, p. 29-36.

In addition, the carbon black has an iodine absorption number between 85 and 210 mg/g, preferably between 95 and 210 mg/g, more preferably between 100 and 160 mg/g, measured to ASTM D1510-1304, and an oil absorption number between 75 and 150 ml/100 g, preferably between 80 and 140 ml/g, more preferably between 85 and 120 ml/g, measured to ASTM D2414.

The unit phr (parts per hundred parts of rubber by weight) used in this document is the unit of quantity customary in the rubber industry for blend formulations. The dosage of the parts by weight of the individual substances is always based on 100 parts by weight of the total polybutadienes.

The amount of carbon black is at least 30 to 100 phr of carbon black, based on the total polybutadiene content.

The expression "charging" or "charging level" relates to the amount of carbon black which is used in the compounding of the rubber compound with introduction of the carbon black. They also produce, in general, rubber compounds which have superior abrasion resistance and tread wear resistance, the amounts of the carbon black of the present invention, which range from about 30 to about 100 phr, can be used for 100 parts by weight of the total polybutadiene content in each case.

The oil to be used is 0.1 phr to 30 phr, based on the total polybutadiene.

Preference is given to using more carbon black than oil, the difference between phr of carbon black and phr of oil being ≤70.

In order to ensure adequate dispersion of the carbon black component in the neodymium-catalysed polybutadiene, the masterbatch factor (MF) is ≤130. The masterbatch factor is calculated as follows:

$$MF = \text{Mooney viscosity of the neodymium-catalysed polybutadiene} - [\text{phr of carbon black} - \text{phr of oil}]$$

Prolonged and relatively vigorous mixing can achieve better carbon black dispersions (i.e. filler distribution) in the polymer, but this also increases the degradation of molar mass of the polymer, which is undesirable.

Preference is given to a neodymium-catalysed polybutadiene with the following properties:
  a Mooney viscosity ($ML_{1+4}$ 100° C.) of 40 to 85 MU, preferably 44 to 65 MU,
  a linearity index (ratio of solution viscosity to Mooney viscosity) of 4 to 8 mPas/MU,
  a Mooney relaxation after 30 seconds of 4 to 8%,
  a polydispersity of <2.2.

A further invention is an NdBR masterbatch comprising
  100 phr of neodymium-catalysed polybutadienes,
  50 to 70 phr of carbon black,
  3 to 10 phr of oil,
  0.2 to 2 phr of stabilizers,
and optionally other assistants.

The invention additionally relates to a process for producing the NdBR masterbatch, which involves a solution mixing operation.

The preferred process according to the invention comprises the following steps:
  a) mixing a neodymium-catalysed polybutadiene prepared by a solution polymerization with a carbon black having an iodine absorption number (ION) between 85-210 mg/g, measured to ASTM D1510-1304, and an oil absorption number (OAN) between 75 and 150 ml/100 g, measured to ASTM D2414, the mixing being preceded by suspension of the carbon black in a liquid, preferably in water, hexane or water/hexane mixture,
b) adding an oil after this or before this or during this,
c) adding a stabilizer and
d) optionally adding other assistants,
e) then removing the liquid.

The selection of the specific carbon black type which is pretreated reduces the mixing stages.

Typically, NdBR masterbatches are produced in 5 mixing stages, mixing stage 1 involving kneading of the mixture at a particular temperature and then doubling it over repeatedly on the roller. Thereafter, the compound is stored for a prolonged period, typically for 24 h, in order that the compound can cool down. This storage is particularly important to be able to introduce the mixing energy necessary in the subsequent mixing stages. Thereafter, the premixture is again mixed at higher temperatures in the kneader, then doubled over again on the roller and rolled. Different mixture components can be added at each stage.

The inventive process produces the NdBR masterbatch in only 2 mixing stages, the $1^{st}$ mixing stage involving kneading the components and then doubling over the inventive masterbatch on the roller.

Step a) is preferably performed until homogeneity, using the neodymium-catalysed polybutadiene prepared, which is dissolved in the polymerization solvent.

Preference is given to using a 10 to 35% carbon black-liquid suspension for step a).

Liquids used are preferably aliphatic hydrocarbons which may have the same composition as the solvent of the butadiene polymerization, or protic solvents such as water.

The solvent and the suspension liquid are removed by means of a stripping process or by means of evaporative concentration.

A further invention is the use of the NdBR wet masterbatch for production of rubber compounds for use in tyres, conveyor belts and shoe soles.

Tyres, conveyor belts and shoe soles which comprise this inventive NdBR wet masterbatch likewise form part of the subject-matter of the invention.

The invention is illustrated in detail hereinafter by examples.

EXAMPLES

The following polybutadiene was used:
1.1 Neodymium-catalysed polybutadiene of the BUNA CB 22 type from Lanxess Deutschland GmbH with the following properties:
cis-1,4 units=97.8%;
1,2-vinyl units=0.5%;
molecular weight Mn=235 kg/mol;
polydispersity Mw/Mn=2.1;
Mooney viscosity ($ML_{1+4}$ 100° C.)=64.9 MU;
solution viscosity (5.43% in toluene, 20° C.)=400 mPas;
linearity index (ratio of solution viscosity to Mooney viscosity)=6.2 mPas/MU;
Mooney relaxation after 30 seconds=4.8%
The following carbon blacks were used:
2.1 Carbon Black N231 from KMF Laborchemie Handels GmbH with the following properties:
iodine absorption number (ION) of 121 mg/g;
oil absorption number (OAN) of 92 mL/100 g.

or
2.2 Carbon Black N326 from KMF Laborchemie Handels GmbH with the following properties:
iodine absorption number (ION) of 82 mg/g;
oil absorption number (OAN) of 72 ml/100 g.

TABLE 1

Composition of the masterbatches

| | Polymer | Carbon black | Oil | Stabilizer |
|---|---|---|---|---|
| Example M | 100 phr Buna CB 22 | 60 phr N231 | 5 phr TDAE | 1 phr Vulkanox 4020 |
| Comparative example M1 | 100 phr Buna CB 22 | 55 phr N326 | 5 phr TDAE | 1 phr Vulkanox 4020 |

Example M

Production of an Inventive Masterbatch with Buna CB 22 with N231

At a temperature of 20° C., a 60 l stirred tank was initially charged with 19 kg of a 9.54% solution of the Nd-BR Buna CB 22 in technical hexane. 1.09 kg of N231 carbon black were initially charged in a 30 l stirred tank, 6 kg of hexane were added and a vat stirrer was used to stir the mixture at 700 rpm. This carbon black mixture was subsequently added to the polybutadiene solution while stirring within 2 hours. Subsequently, 90.6 g of TDAE oil and 18 g of the molten Vulkanox 4020 stabilizer were added, and the mixture was stirred for a further 15 min. The solvent was removed in a continuous one-stage stripper with a steam distillation. The moist masterbatch was dried to constant mass at 60° C. in a vacuum drying cabinet.

Comparative Example M1

Production of a Masterbatch with Buna CB 22 and N 326

At a temperature of 20° C., a 60 l stirred tank was initially charged with 19 kg of a 9.54% solution of the Nd-BR Buna CB 22 in technical hexane. 1.09 kg of N326 carbon black were initially charged in a 30 l stirred tank, 6 kg of hexane were added and a vat stirrer was used to stir the mixture at 700 rpm. This carbon black mixture was subsequently added to the polybutadiene solution while stirring within 2 hours. Subsequently, 90.6 g of TDAE oil and 18 g of the molten Vulkanox 4020 stabilizer were added, and the mixture was stirred for a further 15 min. The solvent was removed in a continuous one-stage stripper with a steam distillation. The moist masterbatch was dried to constant mass at 60° C. in a vacuum drying cabinet.

Production of a Vulcanizate Mixture Using the Masterbatches Produced Above

For the measurement of any changes in properties, the vulcanizate mixtures were produced and tested.

TABLE 2

Formulation of the mixtures

| | Example VM | Comparative example VM1 | Comparative example V1 |
|---|---|---|---|
| Example M | 165 | | |
| Comparative example M1 | | 160 | |
| BUNA CB 22 | | | 100 |
| CORAX N 326 | | | 55 |
| VIVATEC 500 | | | 5 |

TABLE 2-continued

Formulation of the mixtures

|  | Example VM | Comparative example VM1 | Comparative example V1 |
|---|---|---|---|
| EDENOR C 18 98-100 | 2 | 2 | 2 |
| VULKANOX 4020/LG | 2 | 2 | 2 |
| VULKANOX HS/LG | 2 | 2 | 2 |
| ZINC WHITE, RED SEAL | 4 | 4 | 4 |
| ANTILUX 654 | 2.5 | 2.5 | 2.5 |
| GROUND SULPHUR 90/95 CHANCEL | 1.4 | 1.4 | 1.4 |
| VULKACIT CZ/C | 1.5 | 1.5 | 1.5 |

* phr = parts per hundred rubber
Corax N 326 and N 231 as carbon black from KMF Laborchemie Handels GmbH
Vivatec 500 as oil from Hansen & Rosenthal
Zinc white, red seal, as zinc oxide from Grillo Zinkoxid GmbH
EDENOR C 18 98-100 as stearic acid from Cognis Deutschland GmbH
Vulkanox ® 4020/LG and Vulkanox ® HS/LG as stabilizers from Lanxess Deutschland GmbH
Vulkacit ® CZ/C as an accelerator from Lanxess Deutschland GmbH
Antilux 654 as a stabilizer from Rhein Chemie Rheinau GmbH
RHENOGRAN IS 60-75 as sulphur from Rhein Chemie Rheinau GmbH Example VM and Comparative Example VM1

Production of Vulcanizate Mixture Using the Masterbatch

The production was effected according to the formulation from Tab. 2 in a 350 ml Brabender at 40 rpm. After a mixing time of 5 min, the mixture was processed on a roller, the resulting melt sheet was cut three times on the right and on the left, and the sheet was doubled over three times.

Comparative Example V1

Production of Vulcanizate Mixture without Masterbatch

The production was effected according to the formulation from Tab. 2 in a 350 ml Brabender at 40 rpm. In a first stage, the Buna CB22, carbon black, oil and stabilizer components were mixed. After a mixing time of 5 min, the mixture was processed on a roller, the resulting melt sheet was cut three times on the right and on the left, and the sheet was doubled over three times. The premixture was stored overnight, in the course of which it was cooled to room temperature. In a third stage, the premixture was mixed with the rest of the components in a Brabender at 40 rpm. After a mixing time of 5 min, the mixture was processed on a roller, the resulting melt sheet was cut three times on the right and on the left, and the sheet was doubled over three times.

TABLE 3

Properties of inventive example VM and comparative example V1

|  |  | Example VM | Comparative example V1 | Change from dry to wet masterbatch in % |
|---|---|---|---|---|
| Mooney viscosity @ 100° C. |  |  |  |  |
| ML 1 + 4 | MU | 105 | 113 | 92% |
| Vulcanizate properties |  |  |  |  |
| Rebound resilience @ 60° C. | % | 63 | 61 | 103% |
| Hardness @ 60° C. | ShA | 64 | 65 |  |
| Dynamic damping DIN 53513, 1K/min, 10 Hz |  |  |  |  |
| E'(0° C.) | MPa | 20.0 | 25.2 |  |
| E' (60° C.) | MPa | 14.1 | 16.0 |  |
| E"(0° C.) | MPa | 1.96 | 2.81 |  |
| E" (60° C.) | MPa | 1.07 | 1.41 |  |
| tan d (0° C.) |  | 0.098 | 0.111 |  |
| tan d (60° C.) |  | 0.076 | 0.088 | 86% |

Table 3 shows the properties of inventive example VM and comparative example V1. The changes from comparative example V1 to inventive example VM are reported in percent, with the comparative example V1 having been defined as 100%. The inventive example VM has a much better filler distribution, recognizable by the reduction in Mooney viscosity, and an improvement in the rolling resistance property, evident by an increase in the rebound resilience at 60° C. and a decrease in the loss factor tangent delta (tan d) at 60° C.

The invention claimed is:

1. A process for producing a wet neodymium-catalysed polybutadiene masterbatch, the process comprising:
   a) suspending a carbon black having:
      an iodine absorption number (ION) of 95-210 mg/g, measured to ASTM D1510-1304, and an oil absorption number (OAN) of 80 and 140 ml/100 g, measured to ASTM D2414 in water, hexane or a water/hexane mixture to form a liquid suspension comprising 10 to 30 wt % carbon black;
   b) mixing a neodymium-catalysed polybutadiene, prepared by a solution polymerization, and having >95% of cis-1,4 units, <1% of 1,2-vinyl content, a narrow polydispersity of less than 3, a Mooney viscosity (ML 1+4 100° C.) between 30 and 90 MU, a high linearity index (ratio of solution viscosity to Mooney viscosity) of 3 to 10 mPas/MU, and a Mooney relaxation after 30 seconds of 2 to 12% with:
   the liquid suspension of carbon black,
   a hydrogenated naphthenic oil having less than 10 ppm of polycyclic aromatics, less than 1 ppm of alpha-benzopyrene, measured by the Grimmer test, a glass transition temperature (Tg) between −80° C. and −40° C., and a level of extractables, extracted with DMSO by the IP 346 method, of less than 3% by weight, and
   a stabilizer,
   thereby forming a resultant solution; and
   c) removing suspension liquid from the resultant solution by a stripping process to provide a wet neodymium-catalysed polybutadiene masterbatch comprising 100 phr of the neodymium-catalysed polybutadienes, 50 to 70 phr of the carbon black, 3 to 10 phr of the oil, and 0.2 to 2 phr of the stabilizer.

2. The process according to claim 1, wherein the oil is added prior to, during, or after the mixing of the liquid suspension of carbon black with the polybutadiene.

3. The process according to claim 1, wherein the polybutadiene, the liquid suspension of the carbon black, the oil, and the stabilizer are mixed in any sequence.

4. The process according to claim 2, wherein the polybutadiene is mixed with the liquid suspension of the carbon black until homogeneity, and prior to mixing with the oil and the stabilizer.

5. The process according to claim 4, wherein the neodymium-catalysed polybutadiene is prepared by solution polymerization in a polymerization solvent, and after polymerization is dissolved in the polymerization solvent, and the neodymium-catalysed polybutadiene dissolved in the polymerization solvent is mixed with the liquid suspension of the carbon black.

6. The process according to claim 5, wherein:
the carbon black has an iodine absorption number 100 to 160 mg/g, and an oil absorption number of 85 to 120 ml/g.

* * * * *